Figure 1:
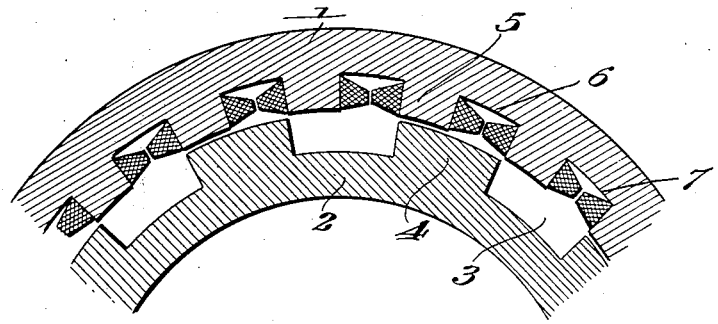

M. LATOUR.
DYNAMO ELECTRIC MACHINE.
APPLICATION FILED NOV. 25, 1916.

1,234,914.

Patented July 31, 1917.

Marius Latour
Inventor
by H. W. Plucker
his Attorney.

UNITED STATES PATENT OFFICE.

MARIUS LATOUR, OF PARIS, FRANCE.

DYNAMO-ELECTRIC MACHINE.

1,234,914. Specification of Letters Patent. Patented July 31, 1917.

Application filed November 25, 1916. Serial No. 133,390.

*To all whom it may concern:*

Be it known that I, MARIUS LATOUR, a citizen of the Republic of France, residing at 22 Rue de Tocqueville, Paris, in the Republic of France, have invented certain new and useful Improvements in Dynamo-Electric Machines, of which the following is a specification.

This invention relates to a high frequency homopolar machine.

Machines of the homopolar type are known; they are constituted by a double core armature (with a fixed central bobbin for the excitation by means of a continuous current) and by a rotary inductor or rotor without any winding. Each half of the rotor (considered as bisected by a plane at right angles to the shaft) has projections of one polarity only, the intermediate gaps replacing, from the point of view of induction in the stator, poles of opposite sign.

The advantage of these machines is that no exciting winding on the inductor is required, and, as long as only this movable part of the machine is considered, it is possible to construct it for the highest frequencies. Thus with a peripheral speed of 150 meters per second it is possible to construct a rotor for 30,000 periods by constructing polar projections of 2.5 mm. in thickness and empty gaps of 2.5 mm.

However, it would not be easy to construct on the stator armature, over a width of 2.5 mm., a channel of a width sufficient to hold the copper, while yet reserving a thickness sufficient for one tooth.

A primary object of the invention is to avoid this difficulty, that is to provide a machine wherein for a given frequency a larger space in the stator armature may be reserved for copper.

To this end I provide fewer recesses in the stator, but a larger number of projections on the rotor, the number of recesses and projections having a definite relation. In accordance with this invention, I construct a homopolar machine such that if $2m$ be the number of recesses upon the stator, the number of polar projections upon the rotor instead of being $m$ will be $(2n+1)m$, where $n$ is a positive integer.

The frequency of the machine is governed by the number of projections on the rotor.

The rotor may be solid. If it be desired to avoid losses at the ends of the polar projections it will be necessary to have laminated polar projections, preferably laminated parallel to the shaft, and the masses of sheet metal which constitutes said projections may be connected to or mounted on a cylinder of some material which is a good electrical conductor, so that said material is caused to act as a screen to the flux produced by the current supplied to the machine, which flux otherwise occasions losses.

The accompanying drawings illustrate diagrammatically the distinction between the old and the new machine. In these drawings:—

Figure 2:
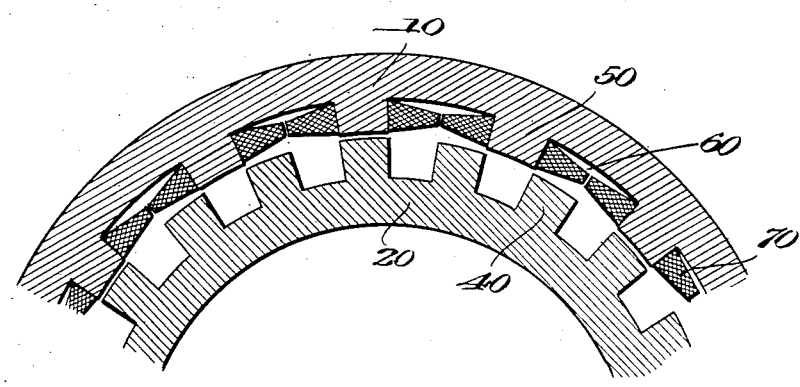

Figure 1 represents two relatively rotatable elements constructed in accordance with the principle of the known homopolar machines referred to, and Fig. 2 represents two relatively rotatable elements constructed in accordance with the present invention.

In these diagrams 1 and 10 are to be regarded as an elemental portion of the stator and 2 and 20 as such a portion of the rotor. It is assumed that the elemental portions are connected by an energized magnetic circuit (such as one of low reluctance) whereby the magnetomotive force between the cores of the elements 1, 2 or 10, 20 remains substantially constant for all positions of the rotor.

The intermediate gaps 3 of rotor 2 replace poles of a sign opposite to that of the projections 4, but when a very high frequency is desired the projections 5 of the stator become so numerous that the gaps 6 do not allow sufficient space for copper for the coils 7.

According to the present invention the number of stator projections 50 is made less than the number of stator projections 5 for a given angular span of stator, whereby the gaps 60 allow space for more copper for coils 70. The frequency is maintained as before by providing the rotor with projections 40 which are so spaced that if $2m$ be the number of projections of the stator the projections on the rotor will be $(2n+1)m$. In the present instance $n=1$ because for every 2 gaps in the stator 3 projections are provided on the rotor.

What I claim and desire to secure by Letters Patent of the United States is:—

1. A homopolar dynamo comprising two relatively rotatable elements each provided with a plurality of evenly spaced flux conductors, the conductors on the two elements being in close relation, and the number of conductors on one element to that on the other being, for a given angular span, in the ratio of $2m:(2n+1)m$, in which formula $n$ represents a positive integer.

2. A homopolar dynamo comprising two relatively rotatable elements each provided with a plurality of evenly spaced flux conductors, the conductors on the two elements being in close relation, and the number of conductors on one element to that on the other being, for a given angular span, in the ratio of $2m:(2n+1)m$, and induced windings surrounding the flux conductors on the element having the fewer number thereof.

3. A homopolar dynamo comprising a stator and a rotor each provided with a plurality of evenly spaced flux conductors, the conductors on the stator and rotor being in close relation, and the number of conductors on the stator to that on the rotor being, for a given angular span, in the ratio of $2m:(2n+1)m$, in which formula $n$ represents a positive integer.

4. A homopolar dynamo comprising two relatively rotatable elements each provided with a plurality of evenly spaced teeth, the teeth on the two elements being in close relation, and the number of teeth on one element to that on the other being, for a given angular span, in the ratio of $2m:(2n+1)m$, in which formula $n$ represents a positive integer.

In testimony whereof I affix my signature in presence of two witnesses.

MARIUS LATOUR.

Witnesses:
  TOYAN FEBAIRE,
  CHAS. P. PRESSLY.